United States Patent
Bareis et al.

(10) Patent No.: US 7,510,045 B2
(45) Date of Patent: Mar. 31, 2009

(54) POWER-STEERING SYSTEM

(75) Inventors: Helmut Bareis, Eschach (DE); Martin Budaker, Heubach (DE); Oliver Hetzel, Waldstetten (DE); Michael Hauck, Schwaebisch Gmuend (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 168 days.

(21) Appl. No.: 11/588,780

(22) Filed: Oct. 26, 2006

(65) Prior Publication Data

US 2007/0151378 A1 Jul. 5, 2007

(30) Foreign Application Priority Data

Oct. 26, 2005 (DE) .................. 10 2005 051 220

(51) Int. Cl.
*F16H 35/00* (2006.01)

(52) U.S. Cl. .................. 180/444; 180/443; 74/388 PS; 474/112

(58) Field of Classification Search .................. 180/444, 180/443; 474/112; 74/388 PS
See application file for complete search history.

(56) References Cited

U.S. PATENT DOCUMENTS

| | | | | |
|---|---|---|---|---|
| 1,523,676 A | * | 1/1925 | Trussell | 474/112 |
| 4,735,598 A | * | 4/1988 | Moroto et al. | 474/29 |
| 4,766,833 A | * | 8/1988 | Knoos | 114/144 C |
| 5,057,061 A | * | 10/1991 | Sakakibara et al. | 475/210 |
| 5,568,318 A | * | 10/1996 | Leger et al. | 359/618 |
| 5,902,202 A | * | 5/1999 | Guerra | 474/114 |
| 5,957,489 A | * | 9/1999 | Sahara et al. | 280/731 |
| 6,405,816 B1 | * | 6/2002 | Kamen et al. | 180/65.1 |
| 6,468,170 B1 | * | 10/2002 | Ito | 474/18 |
| 6,659,896 B1 | * | 12/2003 | Stief et al. | 474/135 |
| 7,054,585 B2 | * | 5/2006 | Sasamoto et al. | 399/299 |
| 7,191,866 B2 | * | 3/2007 | Sasaki et al. | 180/444 |
| 7,285,065 B2 | * | 10/2007 | Dinca et al. | 474/112 |
| 7,413,051 B2 | * | 8/2008 | Okada | 180/444 |
| 7,413,052 B2 | * | 8/2008 | Sasaki et al. | 180/444 |
| 7,442,137 B2 | * | 10/2008 | Hansen | 474/101 |
| 7,472,773 B2 | * | 1/2009 | Fukuda et al. | 180/444 |
| 2005/0133297 A1 | * | 6/2005 | Chikaraishi | 180/444 |
| 2005/0247514 A1 | | 11/2005 | Heitzer | |

FOREIGN PATENT DOCUMENTS

| | | |
|---|---|---|
| DE | 100 52 275 | 5/2002 |
| DE | 103 10 492 | 9/2004 |
| WO | WO 2004/062982 | 7/2004 |

* cited by examiner

*Primary Examiner*—Paul N Dickson
*Assistant Examiner*—Patrick Centolanzi
(74) *Attorney, Agent, or Firm*—Kenyon & Kenyon LLP

(57) ABSTRACT

A power-steering system, e.g., for a motor vehicle, having an electric motor, which transmits a steering-assist force via a belt transmission to a ball-screw transmission for displacing vehicle wheels, includes a cam, via which the ball-screw transmission and/or electric motor is supported in a steering-gear housing. The tension of a belt of the belt transmission is adjustable by rotating the cam in the steering-gear housing. The cam has at least one cutout on the circumference, and/or the steering-gear housing has at least one cutout in its inner wall. A locking element may be inserted into the cutout, in order to fix the cam in position with respect to the steering-gear housing. After being inserted, the locking element is operatively connected to the cam and the steering-gear housing.

15 Claims, 5 Drawing Sheets

POWER-STEERING SYSTEM

CROSS-REFERENCE TO RELATED APPLICATIONS

The present application claims priority to Application No. 10 2005 051 220.8, filed in the Federal Republic of Germany on Oct. 26, 2005, which is expressly incorporated herein in its entirety by reference thereto.

FIELD OF THE INVENTION

The present invention relates to a power-steering system, e.g., for motor vehicles, having an electric motor, which transmits a steering-assist force via a belt transmission to a ball-screw transmission for displacing vehicle wheels.

BACKGROUND INFORMATION

German Published Patent Application No. 103 10 492 describes that an electric motor responsible for steering assistance is connected by a belt transmission to a ball-screw transmission for displacing vehicle wheels. An output shaft of the electric motor and a ball nut of the ball-screw transmission are each connected to a belt pulley (or toothed disk). The belt pulley of the output shaft of the electric motor is connected to the belt pulley of the ball nut via a belt, so as to be able to drive it. The ball thread converts the rotation of the ball nut into a translational movement of the screw of the ball-screw transmission, or of the gear rack.

The ball nut is supported by a cam in a steering-gear housing such that the center-to-center distance between the output shaft of the electric motor and the screw or the gear rack is variable. The tension of the belt of the belt transmission can be adjusted by rotating the cam (which is, therefore, a part of the ball nut and belt pulley).

Alternatively, or in addition to that, German Published Patent Application No. 103 10 492 also allows the electric motor to be supported via a cam such that the center-to-center distance between the output shaft and the screw or the gear rack is variable.

The belt adjustment is of particular importance to the functioning and the operational reliability of the steering system. When the belt tension decreases, the belt may jump, slip, or become disengaged in some other manner. Consequently, the power-steering system is no longer completely operational.

Influences leading to a decrease in the belt tension can vary as a function of the implementation of the design. For example, a decrease in the belt tension may result from torques that are made up of the belt tension itself, with the eccentricity as a lever arm. However, friction torques from the bearing or torques from the belt transmission, which can lead to a decrease in the belt tension, are also possible. A reduction in the belt tension may also be produced by vibrations during assembly or operation.

Therefore, in order to avoid affecting the operativeness of the power-steering system, a change in the belt tension must be reliably prevented during the further assembly and the operational life of the steering system.

SUMMARY

Example embodiments of the present invention may provide a power-steering system in which the belt tension is protected with the aid of simple and inexpensive measures.

The at least one cutout on the circumference of the cam and/or in the inner wall of the steering-gear housing and the introduction of a locking element into the cutout allow the position of the cam to be fixed with respect to the steering-gear housing. In this manner, the setting of the belt tension resulting from the position of the cam in the steering-gear housing is fixed. In this context, it is provided that after the adjustment of the belt tension, which is achieved by appropriately rotating the cam in the steering-gear housing (to this end, reference is made to German Published Patent Application No. 103 10 492), the reached position is fixed by inserting the locking element into the cutout.

After being inserted into the cutout, the locking element is operatively connected to the inner wall of the steering-gear housing (in a region in which the inner wall of the steering-gear housing is radially adjacent to the circumference of the cam). In addition, the locking element is operatively connected to the circumference of the cam (in a region in which the circumference of the cam is radially adjacent to the inner circumference of the steering-gear housing). The locking element consequently produces an operative connection between the circumference of the cam and the inner wall of the steering-gear housing in a region, which radially surrounds the ring-shaped circumference of the cam. Further fastening measures are not necessary.

The foregoing allows the setting of the belt tension to be protected in a simple and inexpensive manner, both during assembly and in operation. The installation of the locking element may be carried out simply and rapidly. A high degree of operational reliability may result from the arrangement hereof.

The locking element may be frictionally locked and/or force-locked or contour-locked to the cam and/or to the steering-gear housing. In this connection, form-locking of the locking pin, e.g., to both the steering-gear housing and the cam, may be particularly suitable. This may be accomplished in a particularly simple manner in that the inner diameter of the cutout is less than the outer diameter of the locking element in at least one subsection. In this context, the locking element may have an outer profile, e.g., a milled edge. This may reduce the mounting force, and this may be used to compensate for the tolerance of the component parts fastened to each other.

The locking element may be furnished with at least one axially protruding, fixing element in at least one axial direction, in order to fix the locking element with respect to at least one axially adjacent part. The axially protruding, fixing elements, e.g., spikes, allow additional axial fastening of the cam to an adjacent component part to be achieved.

The locking element may be provided on both ends with spikes protruding in the axial direction, in order to fix it with respect to two axially adjacent components, between which the locking element is arranged. Therefore, the cam is fixed or held between axially adjacent components by the locking element. The two axially adjacent components may be, for example, a part of the steering-gear housing and a housing cover. The axial locking action may be produced by the mounting of the housing cover. The mounting of the housing cover allows the spikes to at least partially penetrate the housing cover and the opposite part of the steering gear housing, i.e., the locking pin is held between the components, which means that the additional, mentioned axial locking of the cam is produced.

The cutout and/or the locking pin may be arranged and/or provided with respect to each other such that the cam is precisely movable with respect to the steering-gear housing. The cam may not be completely fixed, but may be given a defined freedom of motion, e.g., the possibility of carrying out a defined rotating motion with respect to the steering-gear housing.

Appropriate arrangement of the locking element and/or the cutout allows the cam to move with respect to the steering-gear housing within certain limits. This may be accomplished in a simple manner in that the inner diameter of the cutout is greater than the outer diameter of the locking pin in at least one subsection. This may be accomplished, for example, by tapering the locking element.

The distance that is consequently present in subsections, between the cam and the locking element, produces a defined freedom of motion of the cam with respect to the steering-gear housing.

The cam may be provided with at least one flexible and/or elastic element over a subsection of its axial length, the cam being connected to the locking element via the at least one flexible and/or elastic element.

The flexible and/or elastic element, which may take the form of a rubber ring, facilitates the positioning of the cam in the steering-gear housing, without, however, disruptively limiting its desired, defined ability to rotate with respect to the steering-gear housing.

The locking element may take the form of a locking pin.

According to an example embodiment of the present invention, a power-steering system includes: a belt transmission; a ball-screw transmission; an electric motor adapted to transmit a steering-assist force via the belt transmission to the ball-screw transmission to displace vehicle wheels; a cam; a steering-gear housing, at least one of (a) the ball-screw transmission and (b) the electric motor supported in the steering-gear housing by the cam, tension of a belt of the belt transmission adjustable by rotation of the cam with respect to the steering-gear housing, at least one of (a) a circumference of the cam and (b) an inner wall of the steering gear housing includes at least one cutout; and a lock device insertable into the cutout to fix the cam in position with respect to the steering-gear housing, the lock device operatively connected to the cam and the steering-gear housing after insertion.

The power steering system may be arranged as a power steering system for a motor vehicle.

The lock device may be at least one of (a) frictionally locked and (b) form-locked to at least one of (a) the cam and (b) the steering-gear housing.

An inner diameter of the cutout may be less than an outer diameter of the lock device in at least one subsection.

The lock device may be arranged as a lock pin.

The lock pin may be cylindrical.

The lock pin may include an outer profile.

The outer profile may be arranged as a milled edge.

The lock pin may include at least one axially protruding, fixation device in at least an axial direction to fix it with respect to at least one axially adjacent component.

On both axial ends, the lock pin may include at least one axially protruding, fixation device to fix it with respect to two axially adjacent components, between which the locking pin is arranged.

A first one of the axially adjacent components may include the steering-gear housing, and a second one of the axially adjacent components may include a housing cover.

An axial lock may be provided by the fixation devices by mounting the housing cover.

At least one of (a) the cutout and (b) the lock pin may be at least one of (a) formed and (b) arranged with respect to each other such that the cam is swivelable with respect to the steering-gear housing in a defined manner.

An inner diameter of the cutout may be greater than an outer diameter of the lock pin in at least one subsection.

The lock pin may include a taper.

One of (a) a disk and (b) a ring arranged as a limit stop for the cam may be connected to the steering-gear housing in a rotatably fixed manner via the lock pin.

The ring may be arranged at a distance from a circumference of the cam.

At least one of (a) a flexible and (b) an elastic device may be arranged between the ring and an end face of the circumference facing the ring.

A further at least one of (a) an elastic and (b) a flexible device may be arranged at an end face of the circumference facing away from the ring.

The at least one of (a) the flexible and (b) the elastic device and the further at least one of (a) the elastic and (b) the flexible device may be arranged as a flexible connection between the circumference of the cam and the lock pin.

The at least one of (a) the flexible and (b) the elastic device and the further at least one of (a) the elastic and (b) the flexible device may include rubber rings.

The ring may include a cutout adapted to receive the lock pin.

An inner diameter of the cutout may be less than an outer diameter of the lock pin in at least one subsection.

An inner diameter of the cutout of the at least one of (a) the circumference of the cam and (b) the inner wall of the steering-gear housing may correspond to an inner diameter of the cutout of the ring, the lock pin including a taper in the region of the cutout of the at least one of (a) the circumference of the cam and (b) the inner wall of the steering-gear housing.

Example embodiments of the present invention are described in more detail below with reference to the appended Figures.

DETAILED DESCRIPTION

Conventional power-steering systems for motor vehicles are described, for example, in German Published Patent Application No. 100 52 275.

An electromechanical steering system having a concentric, paraxial, or axially parallel drive, including an electric motor, which transmits a steering-assist force via a belt transmission to a ball-screw transmission, and in which a cam is introduced for adjusting the belt tension, is described in German Published Patent Application No. 103 10 492, which is expressly incorporated herein in its entirety by reference thereto.

Figure 1:
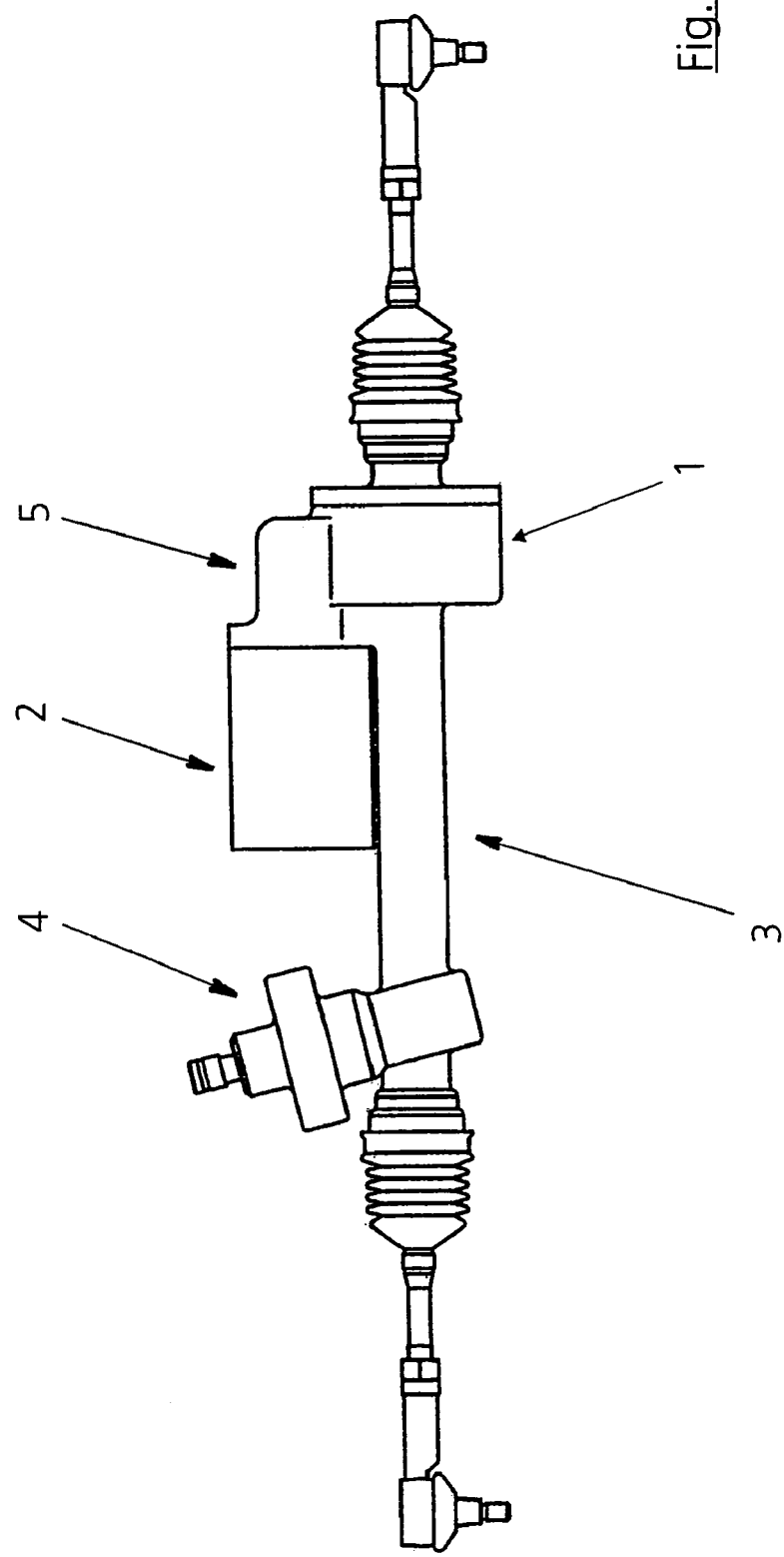
FIG. 1 is a schematic view of a power-steering system including a screw or gear rack, a pinion having a torque sensor, an electric motor, and a transmission device.

FIG. 1 illustrates a power-steering system, e.g., for motor vehicles, having a steering-gear housing 1, an electric motor 2, and a gear rack 3 for displacing vehicle wheels. Gear rack 3 takes the form of a screw in at least one subsection. In addition, the power-steering system has a pinion and torque sensor 4, as well as a belt transmission 5, with the aid of which gear rack 3 is operatively connected to an output shaft 6 of electric motor 2, illustrated in greater detail in FIG. 2.

Figure 2:
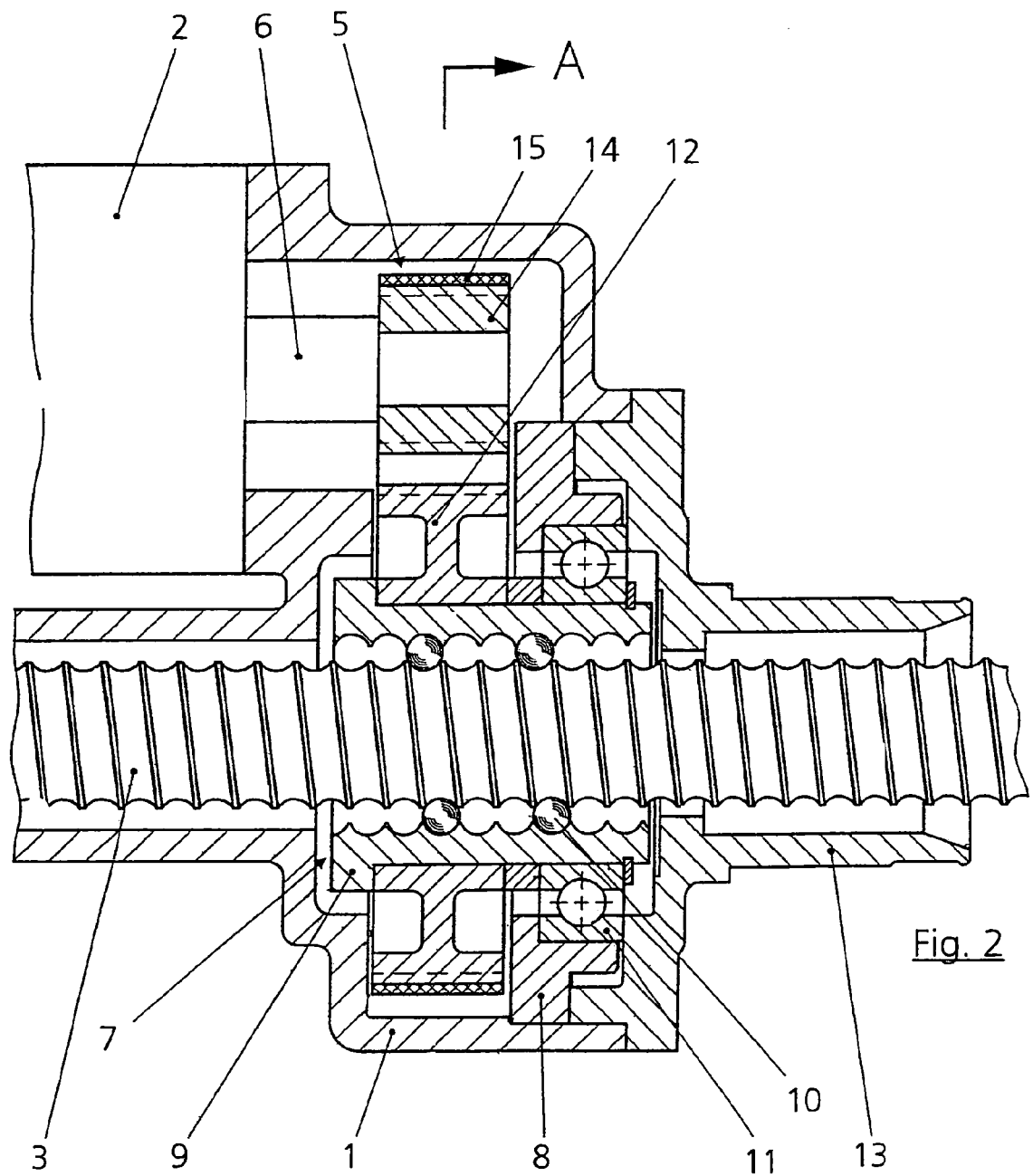
FIG. 2 is a longitudinal cross-sectional view of the screw or the gear rack of the power-steering system illustrated in FIG. 1.

As illustrated in FIG. 2, a ball-screw transmission 7 is supported in steering-gear housing 1 via a cam 8, which may take the form of a cam ring. In this context, cam 8 allows the center-to-center distance between output shaft 6 and gear rack 3 to be varied. As an alternative, the cam may also adjustably support the electric motor.

In a conventional manner, ball-screw transmission 7 may include the screw-shaped part of gear rack 3, a steering nut 9, balls 10, and a bearing 11. In this context, steering nut 9 is connected to a belt pulley 12 or a toothed disk in a rotatably fixed manner. Belt pulley 12 forms a part of belt transmission 5.

Steering nut 9 is supported in steering-gear housing 1 by bearing 11 and cam ring 8. A housing cover 13 both fixes bearing 11 in cam 8 without play and fixes cam 8 in steering-gear housing 1.

Output shaft 6 of electric motor 2 is connected in a rotatably fixed manner to a belt pulley 14 or a toothed disk, which constitutes a part of belt transmission 5. A belt 15 produces the connection of electric motor 2 to gear rack 3 and ball-screw transmission 7. Belt transmission 5 therefore includes belt 15 and the two belt pulleys 12, 14. To connect the two belt pulleys 12, 14, belt 15 may be manufactured as, e.g., a toothed belt, a V-belt, a multiribbed belt (Poly-V), etc.

Figure 3:
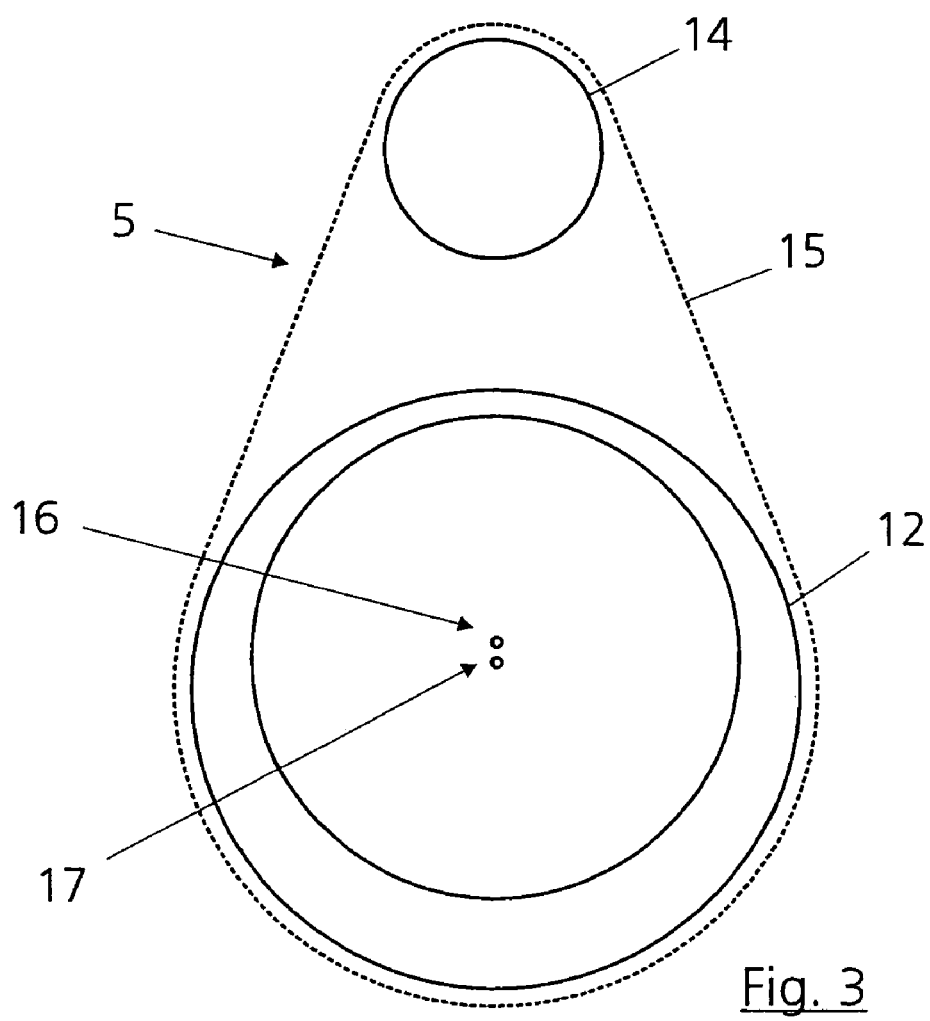
FIG. 3 is a schematic cross-sectional view of a belt transmission.

FIG. 3 is a cross-sectional view of belt transmission 5, including belt 15 and the two belt pulleys 12, 14. The axis of belt pulley 12 is displaced by rotating the cam 8 in steering-gear housing 1. An eccentric axis 16 and a centric axis 17 are schematically illustrated in FIG. 3.

Details regarding the mounting and/or adjustment of belt 15, belt pulleys 12, 14, as well as cam 8, may be found in German Published Patent Application No. 103 10 492, which is expressly incorporated herein in its entirety by reference thereto.

The tension of belt 15 is set by rotating the cam 8 in steering-gear housing 1. As illustrated in FIGS. 4 to 7, cam 8 has a cutout 18 in the circumference. As an alternative, cutout 18 may also be arranged in an inner wall of steering-gear housing 1 or partially in the inner wall of steering-gear housing 1 and partially in the circumference of cam 8. In this context, more than one cutout 18 may also be provided.

After the belt tension is set by rotating the cam 8 in steering-gear housing 1, a locking element 19 is inserted into cutout 18. In the exemplary embodiments illustrated in FIGS. 4 to 7, the locking element takes the form of a locking pin 19. After being inserted into cutout 18, locking pin 19 is operatively connected to cam 8 and steering-gear housing 1 in a frictionally locked (see, e.g., FIG. 4) or form-locked (see, e.g., FIG. 5) manner.

Figure 4:
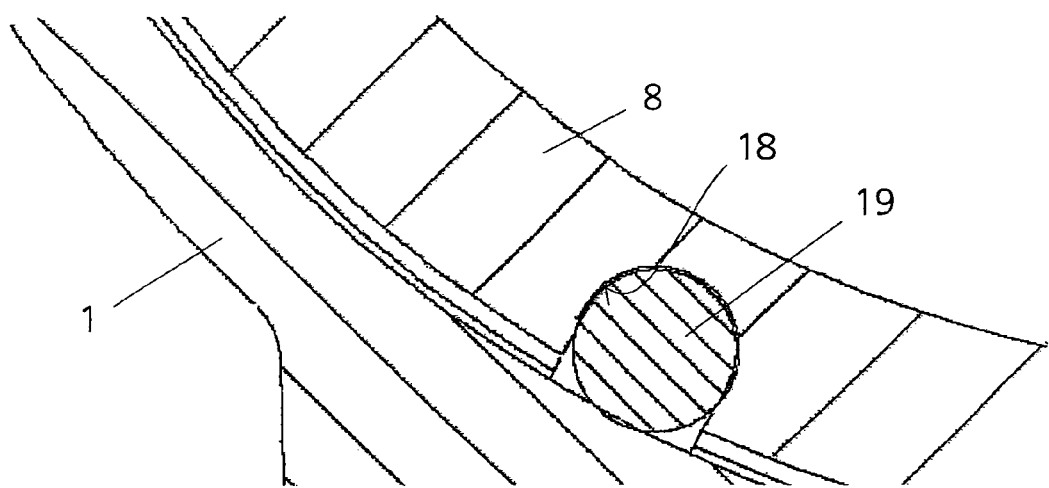
FIG. 4 is a schematic view of an exemplary embodiment of fixing the cam with respect to the steering-gear housing.

As illustrated in FIG. 4, the inner diameter of cutout 18 is less than the outer diameter of locking pin 19. In this context, locking pin 19 is cylindrical.

Figure 5:
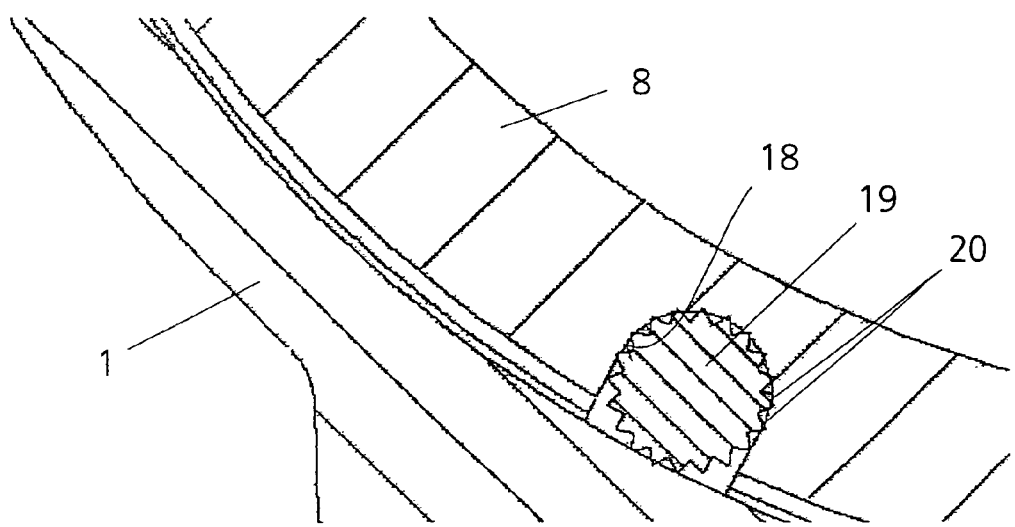
FIG. 5 is a schematic view of an exemplary embodiment of fixing the cam with respect to the steering-gear housing.

The arrangement illustrated in FIG. 5 differs from the arrangement illustrated in FIG. 4 in that locking pin 19 has an outer profile 20 taking the form of a milled edge.

Figure 6:
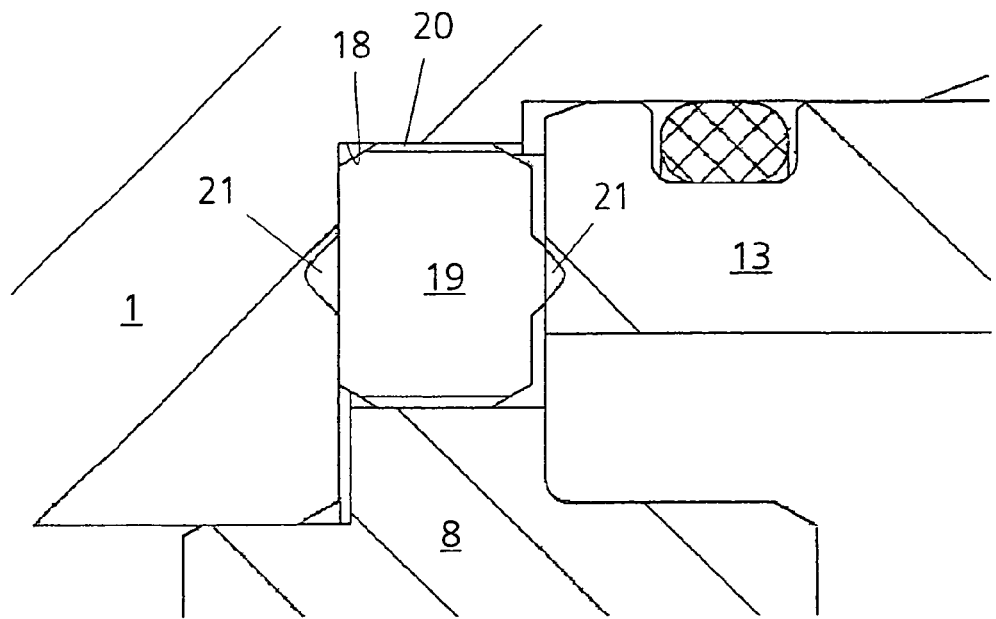
FIG. 6 is a schematic view of an exemplary embodiment of fixing the cam with respect to the steering-gear housing.

The arrangement illustrated in FIG. 6 may be formed in a manner analogous to the arrangement illustrated in FIG. 4 or FIG. 5. In addition to this, however, axially protruding, fixing elements 21 are provided. These take the form of spikes 21 in the axial direction and provide for additional axial locking of cam 8 between two axially adjacent components. The axially adjacent components may include steering-gear housing 1 and housing cover 13. As illustrated in FIG. 6, the axial locking action is produced by mounting housing cover 13.

Figure 7:
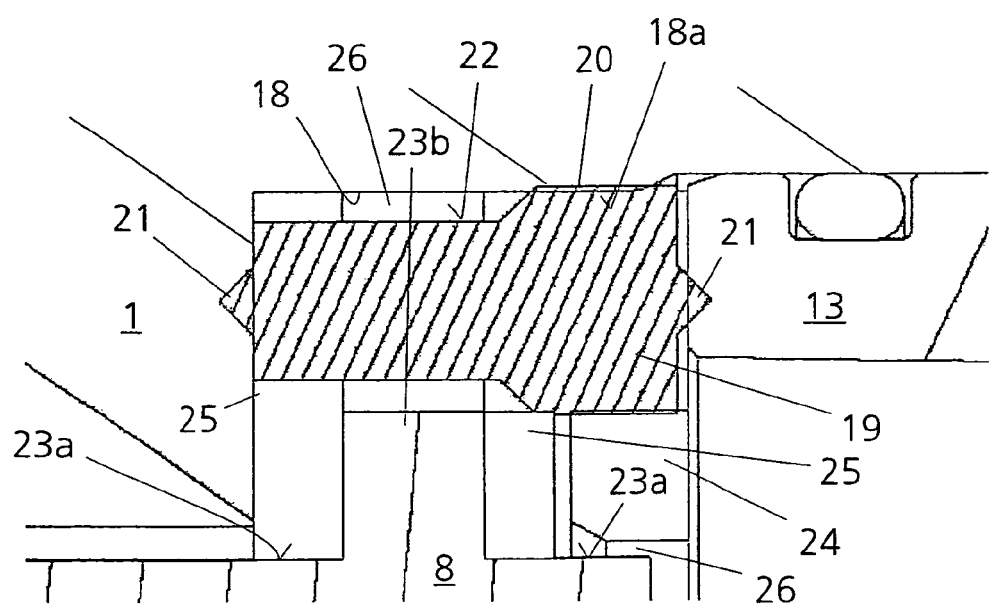
FIG. 7 is a schematic view of an exemplary embodiment of fixing the cam with respect to the steering-gear housing.

Referring to FIG. 7, the starting point may be a locking pin 19, as illustrated in FIGS. 4 to 6. According to the arrangement illustrated in FIG. 7, cam 8 is secured indirectly. In comparison with direct locking, as is produced as illustrated in FIGS. 4 to 6, the arrangement illustrated in FIG. 7 may provide certain advantages, since the indirect locking illustrated in FIG. 7 allows cam 8 to move a little. To this end, a disk or a ring 24 is provided, which is fixed in position in the housing by locking pin 19. Cutout 18 in cam 8 is greater than the outer diameter of locking pin 19. Therefore, locking pin 19 only prevents cam 8 from rotating. An annular gap 26 is present between ring 24 and outer diameter 23a of cam 8.

Ring 24 fixed in steering-gear housing 1 by locking pin 19 is used as an axial limit stop for cam 8. In this context, a flexible and/or elastic element 25, which damps the movement of cam 8 in the direction of ring 24, is between ring 24 and an end face of an outer region 23b of cam 8, which faces ring 24 and forms cutout 18. Flexible and/or elastic element 25 may take the form of a rubber ring. A further flexible and/or elastic element 25, which also takes the form of a rubber ring, is arranged on the end face of outer region 23b facing away from ring 24. The two rubber rings 25 contact locking pin 19 without limiting the desired mobility of cam 8.

Rubber rings 25 may be connected to circumference 23a of cam 8 in a conventional manner.

In a manner analogous to cam 8, ring 24 may have a cutout 18a for inserting locking pin 19. In this context, the outer diameter of locking pin 19 and cutout 18a may be adjusted to one another such that locking pin 19 may be connected to ring 24 and steering-gear housing 1 in a frictionally locked and/or form-locked manner. This may be accomplished in that the inner diameter of cutout 18a is less than the outer diameter of locking pin 19 in at least one subsection.

As illustrated in FIG. 7, it may be provided that cutouts 18 and 18a have the same diameter, but that locking pin 19 is provided with a taper in the region of cutout 18, the taper providing that the outer diameter of locking pin 19 is less than the inner diameter of cutout 18.

Example embodiments of the present invention may also be suitable for rack-and-pinion steering systems that have a redundant electrical drive, e.g., for steer-by-wire systems that have a second electric motor and a second belt transmission.

REFERENCE NUMERALS 1 steering-gear housing
2 electric motor
3 gear rack
4 pinion having a torque sensor
5 belt transmission
6 output shaft
7 ball-screw transmission
8 cam
9 steering nut
10 balls
11 bearing
12 belt pulley
13 housing cover
14 belt pulley
15 belt
16 eccentric axis
17 centric axis 18 cutout
19 locking element
20 outer profile
21 fixing element
22 taper
23a,b outer region of the cam
24 ring
25 flexible and/or elastic elements
26 annular gap

What is claimed is:

1. A power steering system, comprising:
a belt transmission;
a ball-screw transmission;
an electric motor adapted to transmit a steering-assist force via the belt transmission to the ball-screw transmission to displace vehicle wheels;
a cam;
a steering-gear housing, at least one of (a) the ball-screw transmission and (b) the electric motor supported in the steering-gear housing by the cam, tension of a belt of the belt transmission adjustable by rotation of the cam with respect to the steering-gear housing, at least one of (a) a circumference of the cam and (b) an inner wall of the steering gear housing includes at least one cutout; and
a lock device insertable into the cutout to fix the cam in position with respect to the steering-gear housing, the lock device operatively connected to the cam and the steering-gear housing after insertion;
wherein the lock device is arranged as a lock pin;
wherein the lock pin includes an outer profile; and
wherein the outer profile is arranged as a milled edge.

2. The power steering system according to claim 1, wherein on both axial ends, the lock pin includes at least one axially protruding, fixation device to fix it with respect to two axially adjacent components, between which the locking pin is arranged.

3. The power steering system according to claim 2, wherein a first one of the axially adjacent components includes the steering-gear housing and a second one of the axially adjacent components includes a housing cover.

4. The power steering system according to claim 3, wherein an axial lock is provided by the fixation devices by mounting the housing cover.

5. A power steering system, comprising:
a belt transmission;
a ball-screw transmission;
an electric motor adapted to transmit a steering-assist force via the belt transmission to the ball-screw transmission to displace vehicle wheels;
a cam;
a steering-gear housing, at least one of (a) the ball-screw transmission and (b) the electric motor supported in the steering-gear housing by the cam, tension of a belt of the belt transmission adjustable by rotation of the cam with respect to the steering-gear housing, at least one of (a) a circumference of the cam and (b) an inner wall of the steering gear housing includes at least one cutout; and
a lock device insertable into the cutout to fix the cam in position with respect to the steering-gear housing, the lock device operatively connected to the cam and the steering-gear housing after insertion;
wherein the lock device is arranged as a lock pin; and
wherein the lock pin includes at least one axially protruding, fixation device in at least an axial direction to fix it with respect to at least one axially adjacent component.

6. A power steering system, comprising:
a belt transmission;
a ball-screw transmission;
an electric motor adapted to transmit a steering-assist force via the belt transmission to the ball-screw transmission to displace vehicle wheels;
a cam;
a steering-gear housing, at least one of (a) the ball-screw transmission and (b) the electric motor supported in the steering-gear housing by the cam, tension of a belt of the belt transmission adjustable by rotation of the cam with respect to the steering-gear housing, at least one of (a) a circumference of the cam and (b) an inner wall of the steering gear housing includes at least one cutout; and
a lock device insertable into the cutout to fix the cam in position with respect to the steering-gear housing, the lock device operatively connected to the cam and the steering-gear housing after insertion;
wherein the lock device is arranged as a lock pin;
wherein at least one of (a) the cutout and (b) the lock pin is at least one of (a) formed and (b) arranged with respect to each other such that the cam is swivelable with respect to the steering-gear housing in a defined manner; and
wherein an inner diameter of the cutout is greater than an outer diameter of the lock pin in at least one subsection.

7. A power steering system, comprising:
a belt transmission;
a ball-screw transmission;
an electric motor adapted to transmit a steering-assist force via the belt transmission to the ball-screw transmission to displace vehicle wheels;
a cam;
a steering-gear housing, at least one of (a) the ball-screw transmission and (b) the electric motor supported in the steering-gear housing by the cam, tension of a belt of the belt transmission adjustable by rotation of the cam with respect to the steering-gear housing, at least one of (a) a circumference of the cam and (b) an inner wall of the steering gear housing includes at least one cutout; and
a lock device insertable into the cutout to fix the cam in position with respect to the steering-gear housing, the lock device operatively connected to the cam and the steering-gear housing after insertion;
wherein the lock device is arranged as a lock pin;
wherein at least one of (a) the cutout and (b) the lock pin is at least one of (a) formed and (b) arranged with respect to each other such that the cam is swivelable with respect to the steering-gear housing in a defined manner; and
wherein one of (a) a disk and (b) a ring arranged as a limit stop for the cam is connected to the steering-gear housing in a rotatably fixed manner via the lock pin.

8. The power steering system according to claim 7, wherein the ring is arranged at a distance from a circumference of the cam.

9. The power steering system according to claim 8, wherein at least one of (a) a flexible and (b) an elastic device is arranged between the ring and an end face of the circumference facing the ring.

10. The power steering system according to claim 9, wherein a further at least one of (a) an elastic and (b) a flexible device is arranged at an end face of the circumference facing away from the ring.

11. The power steering system according to claim 10, wherein the at least one of (a) the flexible and (b) the elastic device and the further at least one of (a) the elastic and (b) the flexible device are arranged as a flexible connection between the circumference of the cam and the lock pin.

12. The power steering system according to claim 10, wherein the at least one of (a) the flexible and (b) the elastic device and the further at least one of (a) the elastic and (b) the flexible device include rubber rings.

13. The power steering system according to claim 7, wherein the ring includes a cutout adapted to receive the lock pin.

14. The power steering system according to claim 13, wherein an inner diameter of the cutout is less than an outer diameter of the lock pin in at least one subsection.

15. The power steering system according to claim 13, wherein an inner diameter of the cutout of the at least one of (a) the circumference of the cam and (b) the inner wall of the steering-gear housing corresponds to an inner diameter of the cutout of the ring, the lock pin including a taper in the region of the cutout of the at least one of (a) the circumference of the cam and (b) the inner wall of the steering-gear housing.

* * * * *